US012592800B2

(12) United States Patent
Zhou et al.

(10) Patent No.: US 12,592,800 B2
(45) Date of Patent: Mar. 31, 2026

(54) PATHLOSS REFERENCE SIGNAL AND TRANSMISSION CONFIGURATION INDICATOR STATE ACTIVATION WITH SECONDARY CELL ACTIVATION

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/253,006

(22) PCT Filed: Jan. 29, 2021

(86) PCT No.: PCT/CN2021/074294
§ 371 (c)(1),
(2) Date: May 15, 2023

(87) PCT Pub. No.: WO2022/160225
PCT Pub. Date: Aug. 4, 2022

(65) Prior Publication Data
US 2024/0014975 A1     Jan. 11, 2024

(51) Int. Cl.
*H04W 24/08*     (2009.01)
*H04B 7/06*     (2006.01)
*H04L 5/00*     (2006.01)

(52) U.S. Cl.
CPC ....... *H04L 5/0051* (2013.01); *H04B 7/06952* (2023.05); *H04L 5/0098* (2013.01); *H04W 24/08* (2013.01)

(58) Field of Classification Search
CPC .. H04L 5/0051; H04L 5/0098; H04B 7/06952
See application file for complete search history.

(56) References Cited

U.S. PATENT DOCUMENTS

2015/0092713 A1*   4/2015   Pelletier ................ H04W 72/20
                                                370/329
2017/0223564 A1*   8/2017   Dinan ................ H04W 72/0453
                  (Continued)

FOREIGN PATENT DOCUMENTS

WO       2020198972 A1    10/2020

OTHER PUBLICATIONS

International Search Report and Written Opinion—PCT/CN2021/074294—ISA/EPO—Oct. 8, 2021.

*Primary Examiner* — Fahmida S Chowdhury
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a base station, a message that indicates a secondary cell (SCell) for activation. The UE may measure a reference signal on the SCell to estimate pathloss based at least in part on receiving the message and without receiving an additional message that indicates the reference signal for activation. Additionally, or alternatively, the UE may transmit or receive information on the SCell, using a transmission configuration indicator (TCI) state that is based at least in part on receiving the message, without receiving an additional message that indicates the TCI state for activation. Numerous other aspects are described.

29 Claims, 12 Drawing Sheets

(56)        References Cited

U.S. PATENT DOCUMENTS

| | | | | |
|---|---|---|---|---|
| 2019/0116585 A1* | 4/2019 | Chakraborty | ......... | H04L 5/0048 |
| 2019/0253986 A1* | 8/2019 | Jeon | ...................... | H04W 16/28 |
| 2019/0281587 A1* | 9/2019 | Zhang | .................. | H04W 72/23 |
| 2019/0349867 A1* | 11/2019 | MolavianJazi | ....... | H04W 52/16 |
| 2019/0349983 A1* | 11/2019 | Loehr | .................. | H04L 5/0098 |
| 2020/0022011 A1* | 1/2020 | Lee | ........................ | H04B 17/21 |
| 2020/0053579 A1* | 2/2020 | Lu | ........................ | H04W 52/146 |
| 2021/0051710 A1* | 2/2021 | Cirik | .................... | H04L 5/0023 |
| 2021/0135741 A1* | 5/2021 | Zhou | .................... | H04B 7/0404 |
| 2021/0143957 A1* | 5/2021 | Gao | ..................... | H04L 5/0053 |
| 2021/0168742 A1* | 6/2021 | Li | ......................... | H04W 80/02 |
| 2022/0279460 A1* | 9/2022 | Zhang | .................. | H04W 72/02 |
| 2022/0385415 A1* | 12/2022 | Matsumura | .......... | H04W 52/04 |
| 2022/0386332 A1* | 12/2022 | Yokomakura | ......... | H04W 72/23 |
| 2023/0023719 A1* | 1/2023 | Ji | ......................... | H04W 72/21 |
| 2023/0032909 A1* | 2/2023 | Matsumura | .......... | H04W 72/04 |
| 2023/0171771 A1* | 6/2023 | Guo | ..................... | H04L 5/0094 |
| | | | | 370/329 |
| 2023/0199670 A1* | 6/2023 | Zhang | .................. | H04W 52/16 |
| | | | | 455/522 |
| 2023/0261719 A1* | 8/2023 | Liu | ...................... | H04L 5/0051 |
| | | | | 375/267 |
| 2023/0396396 A1* | 12/2023 | Li | ......................... | H04L 5/0091 |
| 2023/0413283 A1* | 12/2023 | Matsumura | .......... | H04L 1/1854 |
| 2024/0014975 A1* | 1/2024 | Zhou | .................. | H04B 7/06952 |
| 2024/0015753 A1* | 1/2024 | Matsumura | .......... | H04L 5/0053 |
| 2024/0121851 A1* | 4/2024 | Matsumura | .......... | H04B 17/309 |

* cited by examiner

710 Receive a message that indicates a secondary cell (SCell) for activation

720 Measure a reference signal on the SCell to estimate pathloss based at least in part on receiving the message and without receiving an additional message that indicates the reference signal for activation

700

810   Transmit a message that indicates an SCell for activation

820   Refrain from transmitting an additional message that indicates a reference signal for activation that is used to estimate pathloss on the SCell

800

910 — Receive a message that indicates an SCell for activation

920 — Transmit or receive information on the SCell, using a transmission configuration indicator (TCI) state that is based at least in part on receiving the message, without receiving an additional message that indicates the TCI state for activation

900

1010   Transmit a message that indicates an SCell for activation

1020   Refrain from transmitting an additional message that indicates a TCI state for activation that is used to transmit or receive information on the SCell

1000

PATHLOSS REFERENCE SIGNAL AND TRANSMISSION CONFIGURATION INDICATOR STATE ACTIVATION WITH SECONDARY CELL ACTIVATION

CROSS-REFERENCE TO RELATED APPLICATION

This application is a 35 U.S.C. 371 national stage application of PCT Application No. PCT/CN2021/074294, filed on Jan. 29, 2021, entitled "PATHLOSS REFERENCE SIGNAL AND TRANSMISSION CONFIGURATION INDICATOR STATE ACTIVATION WITH SECONDARY CELL ACTIVATION," which is expressly incorporated by reference herein.

FIELD OF THE DISCLOSURE

Aspects of the present disclosure generally relate to wireless communication and to techniques and apparatuses for activating a pathloss reference signal and/or a transmission configuration indicator state with secondary cell activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) includes a memory and one or more processors coupled to the memory, the memory and the one or more processors configured to receive, from a base station, a message that indicates a secondary cell (SCell) for activation; and measure a reference signal on the SCell to estimate pathloss based at least in part on receiving the message and without receiving an additional message that indicates the reference signal for activation.

In some aspects, an apparatus for wireless communication at a base station includes a memory and one or more processors coupled to the memory, the memory and the one or more processors configured to transmit, to a UE, a message that indicates an SCell for activation; and refrain from transmitting, to the UE, an additional message that indicates a reference signal for activation that is used to estimate pathloss on the SCell.

In some aspects, an apparatus for wireless communication at a UE includes a memory and one or more processors operatively coupled to the memory, the memory and the one or more processors configured to receive, from a base station, a message that indicates an SCell for activation; and transmit or receive information on the SCell, using a transmission configuration indicator (TCI) state that is based at least in part on receiving the message, without receiving an additional message that indicates the TCI state for activation.

In some aspects, an apparatus for wireless communication at a base station includes a memory and one or more processors operatively coupled to the memory, the memory and the one or more processors configured to transmit, to a UE, a message that indicates an SCell for activation; and refrain from transmitting, to the UE, an additional message that indicates a TCI state for activation that is used to transmit or receive information on the SCell.

In some aspects, a method of wireless communication performed by a UE includes receiving, from a base station, a message that indicates an SCell for activation; and measuring a reference signal on the SCell to estimate pathloss based at least in part on receiving the message and without receiving an additional message that indicates the reference signal for activation.

In some aspects, a method of wireless communication performed by a base station includes transmitting, to a UE, a message that indicates an SCell for activation; and refraining from transmitting, to the UE, an additional message that indicates a reference signal for activation that is used to estimate pathloss on the SCell.

In some aspects, a method of wireless communication performed by a UE includes receiving, from a base station, a message that indicates an SCell for activation; and transmitting or receiving information on the SCell, using a TCI state that is based at least in part on receiving the message, without receiving an additional message that indicates the TCI state for activation.

In some aspects, a method of wireless communication performed by a base station includes transmitting, to a UE, a message that indicates an SCell for activation; and refraining from transmitting, to the UE, an additional message that indicates a TCI state for activation that is used to transmit or receive information on the SCell.

In some aspects, a non-transitory computer-readable medium storing a set of instructions for wireless communication includes one or more instructions that, when executed by one or more processors of a UE, cause the UE to receive, from a base station, a message that indicates an SCell for activation; and measure a reference signal on the SCell to estimate pathloss based at least in part on receiving the message and without receiving an additional message that indicates the reference signal for activation.

In some aspects, a non-transitory computer-readable medium storing a set of instructions for wireless communication includes one or more instructions that, when executed by one or more processors of a base station, cause the base station to transmit, to a UE, a message that indicates an SCell for activation; and refrain from transmitting, to the UE, an additional message that indicates a reference signal for activation that is used to estimate pathloss on the SCell.

In some aspects, a non-transitory computer-readable medium storing a set of instructions for wireless communication includes one or more instructions that, when executed by one or more processors of a UE, cause the UE to receive, from a base station, a message that indicates an SCell for activation; and transmit or receive information on the SCell, using a TCI state that is based at least in part on receiving the message, without receiving an additional message that indicates the TCI state for activation.

In some aspects, a non-transitory computer-readable medium storing a set of instructions for wireless communication includes one or more instructions that, when executed by one or more processors of a base station, cause the base station to transmit, to a UE, a message that indicates an SCell for activation; and refrain from transmitting, to the UE, an additional message that indicates a TCI state for activation that is used to transmit or receive information on the SCell.

In some aspects, an apparatus for wireless communication includes means for receiving, from a base station, a message that indicates an SCell for activation; and means for measuring a reference signal on the SCell to estimate pathloss based at least in part on receiving the message and without receiving an additional message that indicates the reference signal for activation.

In some aspects, an apparatus for wireless communication includes means for transmitting, to a UE, a message that indicates an SCell for activation; and means for refraining from transmitting, to the UE, an additional message that indicates a reference signal for activation that is used to estimate pathloss on the SCell.

In some aspects, an apparatus for wireless communication includes means for receiving, from a base station, a message that indicates an SCell for activation; and means for transmitting or means for receiving information on the SCell, using a TCI state that is based at least in part on receiving the message, without receiving an additional message that indicates the TCI state for activation.

In some aspects, an apparatus for wireless communication includes means for transmitting, to a UE, a message that indicates an SCell for activation; and means for refraining from transmitting, to the UE, an additional message that indicates a TCI state for activation that is used to transmit or receive information on the SCell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
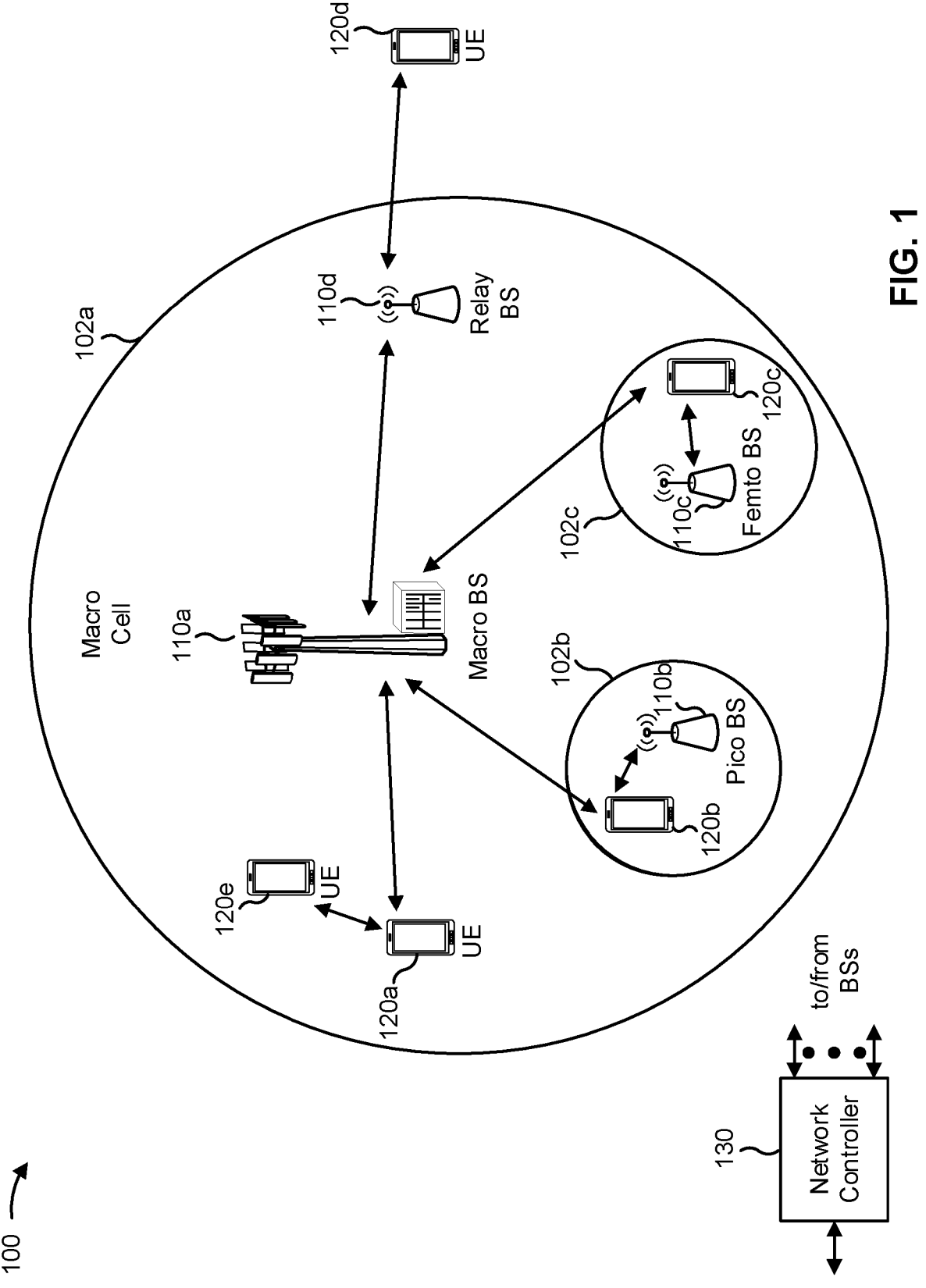
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
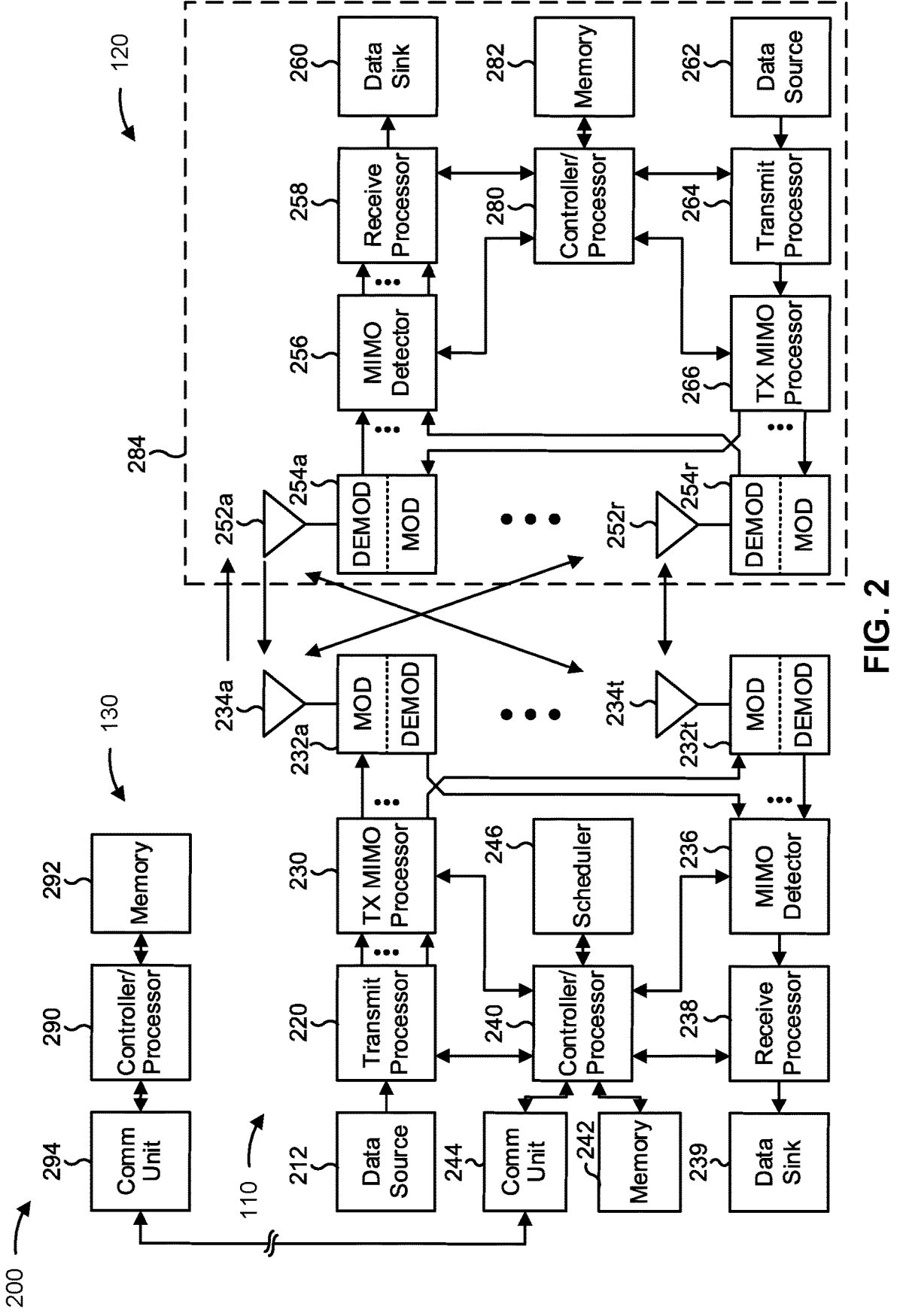
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-10.

Controller/processor 240 of base station 110, controller/processor 280 of UE 120, and/or any other component(s) of FIG. 2 may perform one or more techniques associated with activating a pathloss reference signal and/or a transmission configuration indicator (TCI) state with a secondary cell (SCell) activation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 1100 of FIG. 11) may include means for receiving, from a base station (e.g., the base station 110 and/or apparatus 1200 of FIG. 12), a message that indicates an SCell for activation; and/or means for measuring a reference signal on the SCell to estimate pathloss based at least in part on receiving the message and without receiving an additional message that indicates the reference signal for activation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for selecting the reference signal to measure, wherein the message does not include an indicator of the reference signal.

Additionally, or alternatively, the UE may include means for receiving, from the base station, a message that indicates an SCell for activation; and/or means for transmitting or receiving information on the SCell, using a TCI state that is based at least in part on receiving the message, without receiving an additional message that indicates the TCI state for activation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for selecting the TCI state to use, wherein the message does not include an indicator of the TCI state.

In some aspects, a base station (e.g., the base station 110 and/or apparatus 1200 of FIG. 12) may include means for transmitting, to a UE (e.g., the UE 120 and/or apparatus 1100 of FIG. 11), a message that indicates an SCell for activation; and/or means for refraining from transmitting, to the UE, an additional message that indicates a reference signal for activation that is used to estimate pathloss on the SCell. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

Additionally, or alternatively, the base station may include means for transmitting, to the UE, a message that indicates an SCell for activation; and/or means for refraining from transmitting, to the UE, an additional message that indicates a TCI state for activation that is used to transmit or receive information on the SCell. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
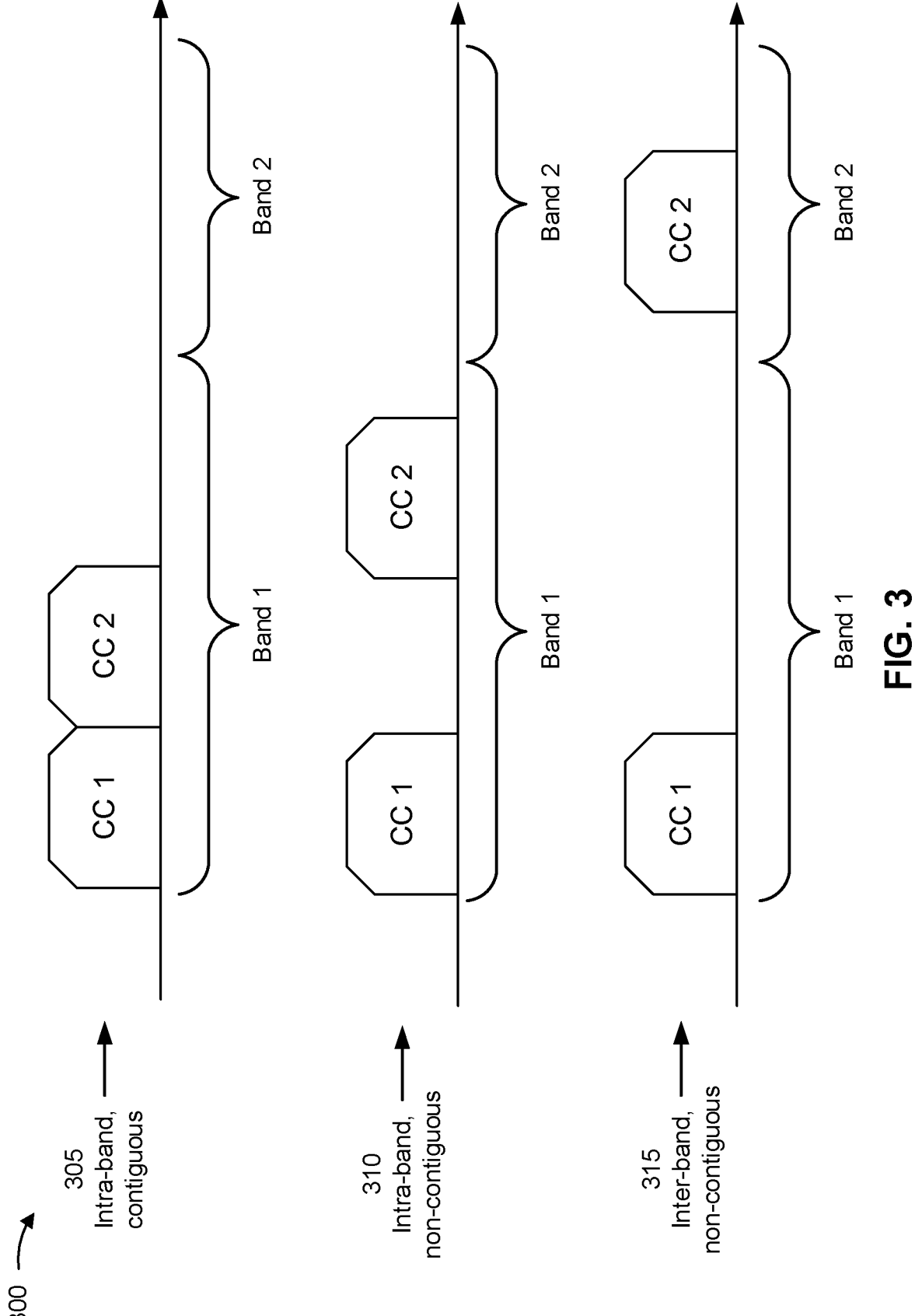
FIG. 3 is a diagram illustrating an example of carrier aggregation, in accordance with the present disclosure.

FIG. 3 is a diagram illustrating examples 300 of carrier aggregation, in accordance with the present disclosure. Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or another signaling message.

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (also referred to as SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 3 is provided as an example. Other examples may differ from what is described with regard to FIG. 3.

Figure 4:
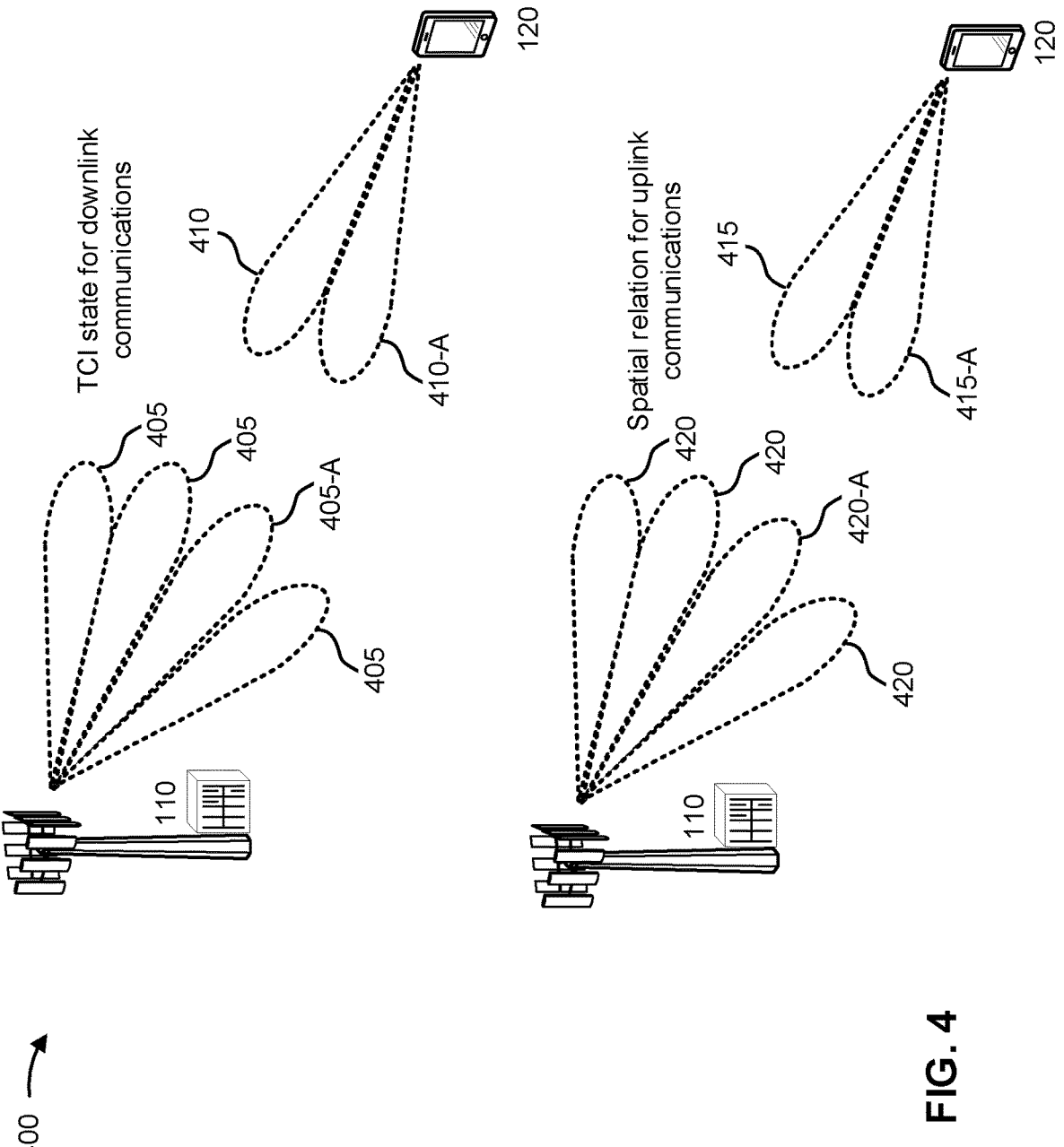
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of TCI states (for example, PDSCH TCI states and CORESET TCI states) for the UE 120 may be configured by a configuration message, such as an RRC message. Additionally, or alternatively, the set of activated TCI states (for example, activated PDSCH TCI states and activated CORESET TCI states) for the UE 120 may be activated and indicated by a medium access control (MAC) layer control element (MAC-CE), which may down-selects a set of TCI states from a pool of TCI states configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

In order to increase throughput to and/or reduce latency with a UE, a base station may configure an SCell, as described above in connection with FIG. 3. For example, the base station may transmit an RRC message (e.g., an rrcConnectionReconfiguration message as defined in 3GPP specifications and/or another standard); a control element, such as a MAC-CE (e.g., a MAC-CE associated with a logic channel identifier (LCID) of 11011 as defined in 3GPP specifications and/or another standard); and/or DCI (e.g., DCI that includes a codepoint, in a channel state information (CSI) request field, that is associated with SCell activation) in order to trigger SCell activation for the UE. However, the base station generally has to transmit an additional message (e.g., an RRC message, a MAC-CE, and/or DCI) to activate a downlink reference signal, transmitted on the SCell, that the UE can use to estimate pathloss (also referred to as a pathloss reference signal or PL RS). Typically, the UE cannot transmit on the SCell until the UE has estimated pathloss and determined an uplink power based at least in part on the estimated pathloss. Additionally, the base station generally has to transmit an additional message (e.g., an RRC message, a MAC-CE, and/or DCI) to activate a TCI state (e.g., as described above in connection with FIG. 4) that the UE can use to receive and/or transmit on the SCell. Typically, the UE cannot receive or transmit on the SCell until the UE knows which TCI state to use.

Some techniques and apparatuses described herein enable a base station (e.g., base station 110) to indicate a pathloss reference signal and/or a TCI state for activation in a message that indicates an SCell for activation. As a result, a UE (e.g., UE 120) may experience increased throughput and/or reduced latency by using the SCell earlier than if the base station 110 had transmitted an additional message to activate the pathloss reference signal and/or an additional message to activate the TCI state. Additionally, the base station 110 may conserve network overhead and resources by refraining from transmitting the additional message to activate the pathloss reference signal and/or the additional message to activate the TCI state.

Additionally, or alternatively, some techniques and apparatuses described herein enable a UE (e.g., UE 120) to determine a pathloss reference signal and/or a TCI state to use based at least in part on a message that indicates an SCell for activation. As a result, a base station (e.g., base station 110) may conserve network overhead and resources by refraining from transmitting an additional message to activate the pathloss reference signal and/or an additional message to activate the TCI state. Additionally, the UE 120 may experience increased throughput and/or reduced latency by using the SCell earlier than if the base station 110 had transmitted the additional message to activate the pathloss reference signal and/or the additional message to activate the TCI state.

Figure 5:
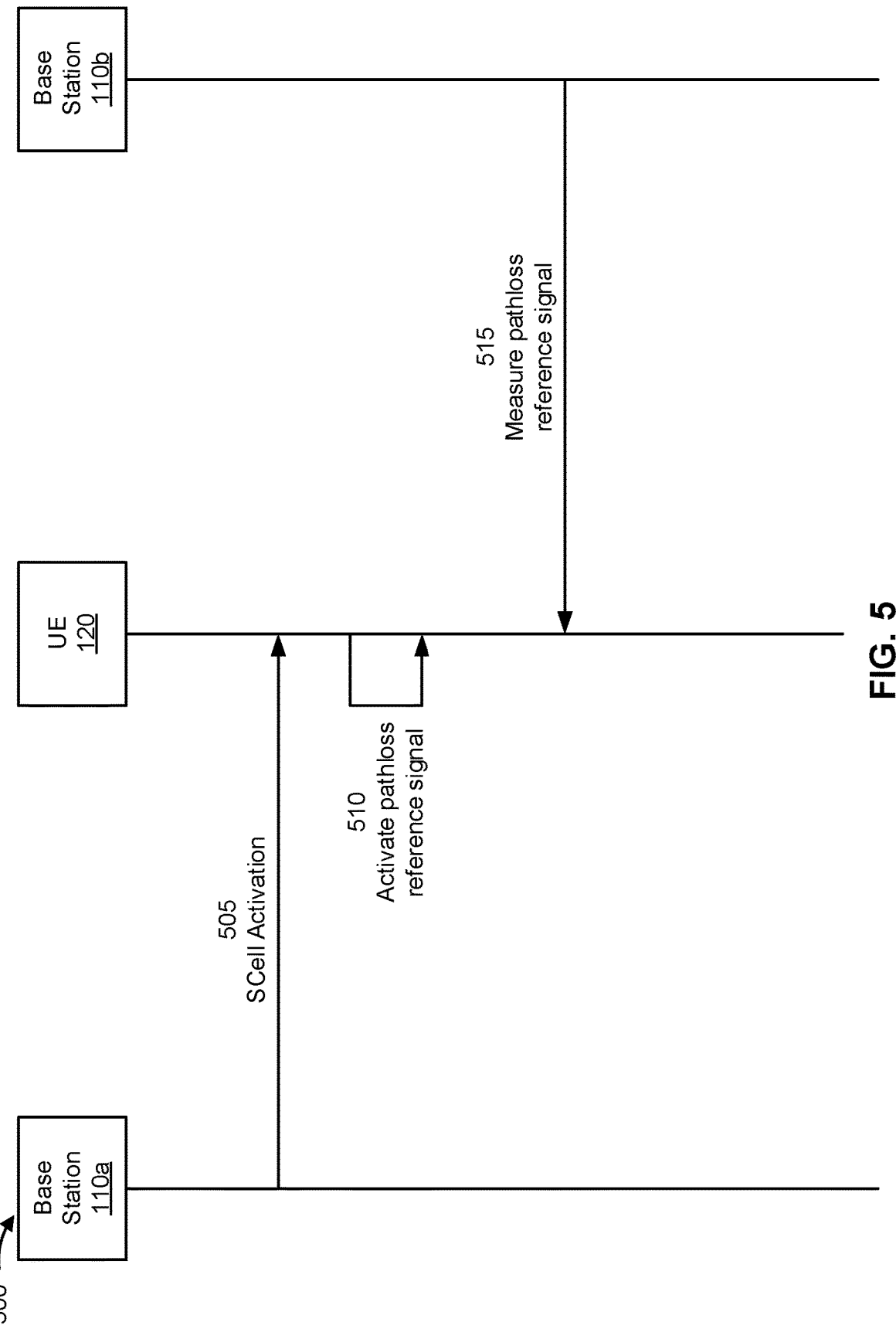
FIG. 5 is a diagram illustrating an example associated with activating a pathloss reference signal with secondary cell (SCell) activation, in accordance with the present disclosure.

FIG. 5 is a diagram illustrating an example 500 associated with activating a pathloss reference signal with SCell activation, in accordance with the present disclosure. As shown in FIG. 5, example 500 includes communication between a PCell (e.g., including a base station 110*a*) and a UE 120. Example 500 further includes communication between an SCell (e.g., including a base station 110*b*) and the UE 120. In some aspects, the base stations 110*a* and 110*b* may be separate (e.g., physically, virtually, and/or logically). As an alternative, in some aspects, the base stations 110*a* and 110*b* may be at least partially integrated (e.g., physically, virtually, and/or logically). The base station 110*a*, the base station 110*b*, and the UE 120 may be included in a wireless network, such as wireless network 100 of FIG. 1.

As shown by reference number 505, the base station 110*a* may transmit, and the UE 120 may receive, a message that indicates the SCell for activation. For example, the base station 110*a* may transmit an RRC message (e.g., an rrcConnectionReconfiguration message as defined in 3GPP specifications and/or another standard); a control element, such as a MAC-CE (e.g., a MAC-CE associated with an LCID of 11011 as defined in 3GPP specifications and/or another standard); and/or DCI (e.g., DCI that includes a codepoint, in a CSI request field, that is associated with SCell activation) in order to trigger SCell activation for the UE 120.

Additionally, the base station 110*a* may refrain from transmitting, to the UE 120, an additional message that indicates a reference signal for activation that is used to estimate pathloss on the SCell. For example, the base station 110*a* may refrain from transmitting another RRC message, another control element (e.g., another MAC-CE), or additional DCI that would trigger pathloss reference signal activation for the UE 120. Accordingly, the base station 110a may conserve network resources.

As shown by reference number 510, the UE 120 may select the reference signal to measure. For example, the UE 120 may select the reference signal based at least in part on the message and without receiving the additional message, as described above.

In some aspects, the message may include an indicator of the reference signal. Accordingly, the message for the SCell activation may additionally indicate one pathloss reference signal as activated for the SCell inside the message. For example, the RRC message that activates the SCell may additionally indicate the pathloss reference signal (e.g., using a PUSCH-PathlossReferenceRS-Id data structure as defined in 3GPP specifications and/or another standard). In another example, the MAC-CE or other control element that activates the SCell may additionally include an identifier (e.g., an updated value for a PUSCH-PathlossReferenceRS-Id data structure as defined in 3GPP specifications and/or another standard) associated with the pathloss reference signal. In yet another example, the DCI that activates the SCell may additionally include an identifier (e.g., an updated value for a PUSCH-PathlossReferenceRS-Id data structure as defined in 3GPP specifications and/or another standard) associated with the pathloss reference signal.

As an alternative, the message may not include an indicator of the reference signal. Instead, the UE 120 may use one or more rules programmed and/or otherwise preconfigured into the UE 120 (e.g., according to 3GPP specifications and/or another standard) in order to select the reference signal.

In some aspects, the UE 120 may select the reference signal based at least in part on one or more identifiers of one or more configured TCI states associated with a PDSCH. For example, the base station 110a may transmit, and the UE 120 may receive, a data structure (e.g., PDSCH-Config as defined in 3GPP specifications and/or another standard) that indicates the one or more configured TCI states (e.g., in a tci-StatesToAddModList table as defined in 3GPP specifications and/or another standard) in an RRC message that configures the SCell (e.g., an rrcConnectionReconfiguration message as defined in 3GPP specifications and/or another standard). This RRC message may be the same message that activates the SCell, as described above, or may be separate (e.g., the base station 110a may transmit a control element and/or DCI to activate the SCell that was configured using the RRC message). Accordingly, a PDSCH configured for the SCell, which is between the UE 120 and the base station 110b in example 500, may be associated with the one or more configured TCI states. As described above, each TCI state may indicate one or more QCL rules, where a rule associates a reference signal with an associated channel property (e.g., Doppler shift; Doppler spread; average delay; delay spread; one or more spatial parameters, such as a spatial filter; and/or the like). In some carriers, such as FR2 and/or other similar carriers, a QCL rule may associate a reference signal with a spatial filter that the UE 120 may use to decode downlink transmissions, and these QCL rules may include QCL-TypeD rules as defined by 3GPP specifications and/or another standard. The UE 120 may therefore select a TCI state of the one or more configured TCI states and use the reference signal indicated in a QCL rule (e.g., a QCL-TypeD rule or, when the TCI state does not include a QCL-TypeD rule, a different QCL rule, such as a QCL-TypeA rule, a QCL-TypeB rule, or a QCL-TypeC rule) of that TCI state, to estimate pathloss on the SCell. In some aspects, the one or more configured TCI states may have associated identifiers (e.g., numerical indices). Accordingly, the UE 120 may select a TCI state from the one or more configured TCI states based at least in part on that TCI state having a smallest associated identifier (e.g., a smallest integer as an associated index) and use the reference signal indicated in a QCL rule of that TCI state. In some examples, the UE 120 may determine the reference signal associated with one TCI state (e.g., having a lowest or highest ID) among those included in the RRC command that configures and/or activates the SCell as the pathloss reference signal activated in the SCell.

Additionally, or alternatively, the UE 120 may select the reference signal based at least in part on one or more identifiers of one or more CORESETs associated with the SCell. For example, the base station 110a may transmit, and the UE 120 may receive, one or more data structures (e.g., one or more ControlResourceSets as defined in 3GPP specifications and/or another standard) that may indicate one or more CORESETs to use on the SCell. In some aspects, the one or more CORESETs may be associated with one or more corresponding TCI states indicated (e.g., using one or more tci-PresentInDCI data structures as defined in 3GPP specifications and/or another standard) in an RRC message that configures the SCell (e.g., an rrcConnectionReconfiguration message as defined in 3GPP specifications and/or another standard). This RRC message may be the same message that activates the SCell, as described above, or may be separate (e.g., the base station 110a may transmit a control element and/or DCI to activate the SCell that was configured using the RRC message). Accordingly, the UE 120 may select a TCI state of the one or more TCI states and use the reference signal indicated in a QCL rule (e.g., a QCL-TypeD rule) of that TCI state, to estimate pathloss on the SCell. In some aspects, the one or more CORESETs may have associated identifiers (e.g., numerical IDs). Accordingly, the UE 120 may select a reference signal based at least in part on that TCI state or QCL-type D assumption being associated with a CORESET that has a smallest associated identifier (e.g., a smallest integer as an associated ID). In some examples, the UE 120 may determine the reference signal associated with the QCL assumption or TCI state of a CORESET with a lowest ID included in the RRC command that configures and/or activates the SCell as the pathloss reference signal activated for the SCell. As an alternative, the UE 120 may determine the reference signal associated with a CORESET of another cell as the pathloss reference signal activated for the SCell. For example, the CORESET may be associated with the lowest controlResourceSetId in intra-band CA.

In some aspects, the UE 120 may select the reference signal based at least in part on one or more identifiers of the CORESET(s) when one or more CORESETs are configured for the SCell, but may, as described above, select the reference signal based at least in part on one or more identifiers of one or more configured TCI states associated with a PDSCH when no CORESETs are configured for the SCell.

Additionally, or alternatively, the UE 120 may select the reference signal based at least in part on an SSB transmitted on the SCell. For example, the UE 120 may measure the SSB transmitted on the SCell (e.g., by the base station 110b in example 500) to estimate pathloss on the SCell. In some aspects, the UE 120 may select the reference signal based at least in part on one or more identifiers of the CORESET(s) when one or more CORESETs are configured for the SCell, as described above, but may select the SSB when no CORESETs are configured for the SCell. Additionally, or alternatively, the UE 120 may select the reference signal based at least in part on one or more identifiers of one or more configured TCI states associated with a PDSCH when one or more TCI states are configured for the SCell, as described above, but may select the SSB when no TCI states are configured for the SCell.

Additionally, or alternatively, the UE 120 may select the reference signal based at least in part on a TCI state associated with a PDCCH. For example, the base station 110*a* may transmit, and the UE 120 may receive, a data structure (e.g., a ControlResourceSet as defined in 3GPP specifications and/or another standard) that may indicate a CORESET to use for the PDCCH (e.g., between the UE 120 and the base station 110*b* in example 500). In some aspects, the CORESET may be associated with a TCI state indicated (e.g., using a tci-StatesPDCCH data structure as defined in 3GPP specifications and/or another standard) in an RRC message that configures the SCell (e.g., an rrcConnection-Reconfiguration message as defined in 3GPP specifications and/or another standard). This RRC message may be the same message that activates the SCell, as described above, or may be separate (e.g., the base station 110*a* may transmit a control element and/or DCI to activate the SCell that was configured using the RRC message). Accordingly, the PDCCH configured for the SCell, which is between the UE 120 and the base station 110*b* in example 500, may be associated with that TCI state. Accordingly, the UE 120 may use the reference signal indicated in a QCL rule (e.g., a QCL-TypeD rule) of that TCI state, to estimate pathloss on the SCell. For example, if only a single TCI state is configured by RRC message for one or more CORESETs on the SCell, the UE 120 may determine a reference signal based on that single TCI state as the pathloss reference signal activated for the SCell, such that no separate indication of pathloss reference signal is transmitted.

In some aspects, the UE 120 may select the reference signal based at least in part on the TCI state associated with the PDCCH when the PDCCH is configured for the SCell, but may select the SSB, as described above, when no PDCCH is configured for the SCell. Additionally, or alternatively, the UE 120 may select the reference signal based at least in part on one or more identifiers of the CORESET(s) when one or more CORESETs are configured for the SCell, as described above, but may select the reference signal based at least in part on the TCI state associated with the PDCCH when no CORESETs are configured for the SCell. Additionally, or alternatively, the UE 120 may select the reference signal based at least in part on one or more identifiers of one or more configured TCI states associated with a PDSCH when one or more TCI states are configured for the SCell, as described above, but may select the reference signal based at least in part on the TCI state associated with the PDCCH when no TCI states are configured for the SCell.

As shown by reference number 515, the UE 120 may measure the reference signal on the SCell (e.g., transmitted by the base station 110*b*) to estimate pathloss based at least in part on receiving the message (e.g., as described above in connection with reference number 505) and without receiving the additional message that indicates the reference signal for activation. In some aspects, the UE 120 may estimate the pathloss based at least in part on a difference between a transmit power associated with the reference signal and an RSRP associated with the reference signal as measured by the UE 120. Accordingly, the UE 120 may transmit on the SCell using an uplink transmit power determined based at least in part on the estimated pathloss.

By using techniques as described in connection with FIG. 5, the base station 110*a* may indicate the pathloss reference signal for activation in the message that indicates the SCell for activation. As an alternative, the UE 120 may determine the pathloss reference signal to use based at least in part on the message that indicates the SCell for activation and without the additional message to activate the pathloss reference signal. As a result, the UE 120 may experience increased throughput and/or reduced latency by using the SCell earlier than if the base station 110*a* had transmitted the additional message to activate the pathloss reference signal. Additionally, the base station 110*a* may conserve network overhead and resources by refraining from transmitting the additional message to activate the pathloss reference signal.

As indicated above, FIG. 5 is provided as an example. Other examples may differ from what is described with respect to FIG. 5.

Figure 6:
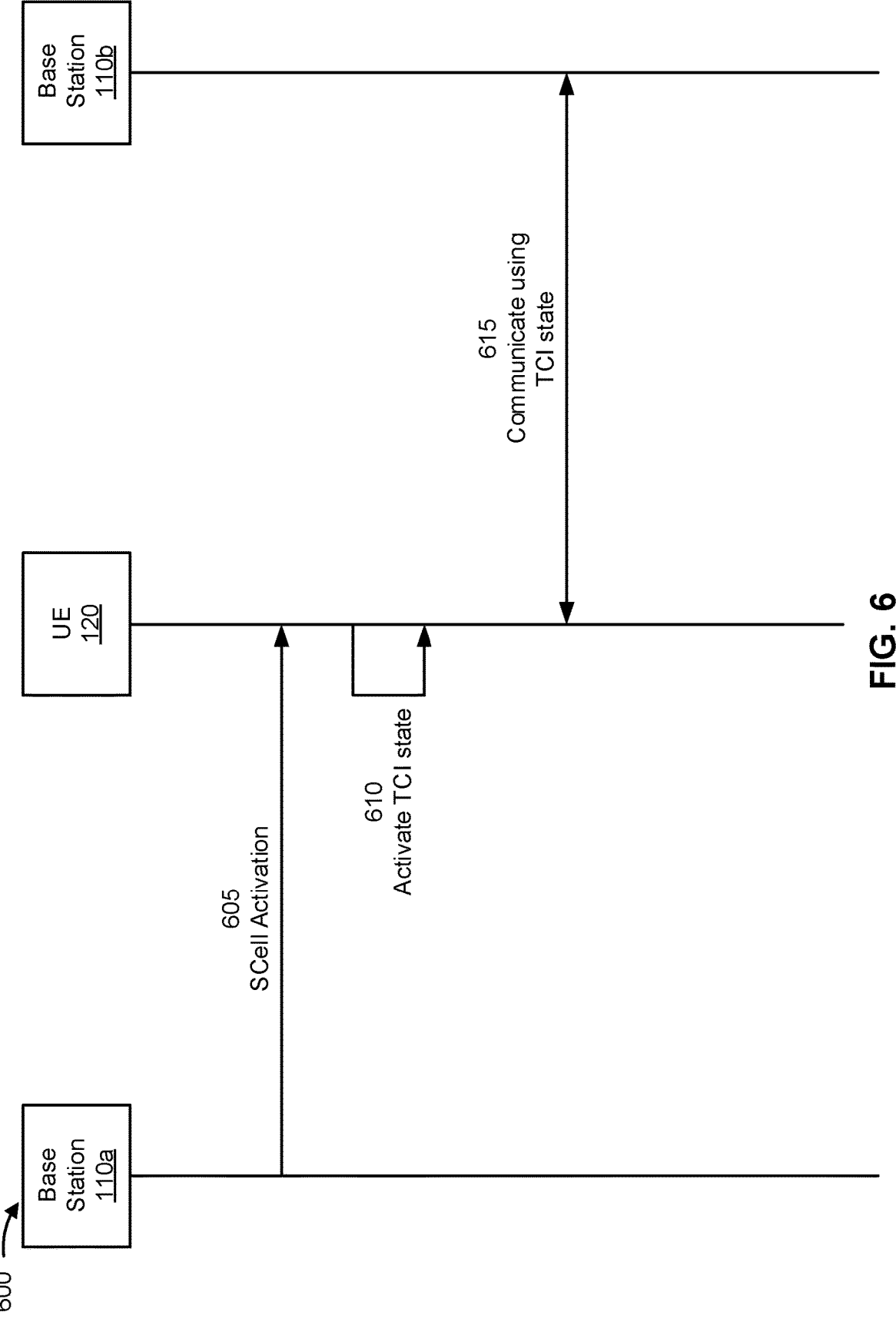
FIG. 6 is a diagram illustrating an example associated with activating a transmission configuration indicator (TCI) state with SCell activation, in accordance with the present disclosure.

FIG. 6 is a diagram illustrating an example 600 associated with activating a TCI state with SCell activation, in accordance with the present disclosure. As shown in FIG. 6, example 600 includes communication between a PCell (e.g., including a base station 110*a*) and a UE 120. Example 600 further includes communication between an SCell (e.g., including a base station 110*b*) and the UE 120. In some aspects, the base stations 110*a* and 110*b* may be separate (e.g., physically, virtually, and/or logically). As an alternative, in some aspects, the base stations 110*a* and 110*b* may be at least partially integrated (e.g., physically, virtually, and/or logically). The base station 110*a*, the base station 110*b*, and the UE 120 may be included in a wireless network, such as wireless network 100 of FIG. 1.

As shown by reference number 605, the base station 110*a* may transmit, and the UE 120 may receive, a message that indicates the SCell for activation. For example, the base station 110*a* may transmit an RRC message (e.g., an rrcConnectionReconfiguration message as defined in 3GPP specifications and/or another standard); a control element, such as a MAC-CE (e.g., a MAC-CE associated with an LCID of 11011 as defined in 3GPP specifications and/or another standard); and/or DCI (e.g., DCI that includes a codepoint, in a CSI request field, that is associated with SCell activation) in order to trigger SCell activation for the UE 120.

Additionally, the base station 110*a* may refrain from transmitting, to the UE 120, an additional message that indicates a TCI state for activation that is used to transmit or receive information on the SCell. For example, the base station 110*a* may refrain from transmitting another RRC message, another control element (e.g., another MAC-CE), or additional DCI that would trigger TCI state activation for the UE 120. Accordingly, the base station 110*a* may conserve network resources.

As shown by reference number 610, the UE 120 may select the TCI state to use. For example, the UE 120 may select the TCI state based at least in part on the message and without receiving the additional message, as described above.

In some aspects, the message may include an indicator of the TCI state. For example, the RRC message that activates the SCell may include a codepoint that indicates the TCI state to use. Accordingly, the RRC message for SCell activation may indicate one TCI state as the TCI state activated for the SCell inside the same RRC message. In some aspects, the codepoint may be based at least in part on an identifier, such as a numerical index, associated with the TCI state. In another example, the MAC-CE or other control element that activates the SCell may include a codepoint that indicates the TCI state, as described above. Accordingly, the MAC-CE message for SCell activation may indicate one TCI state as the TCI state activated for the SCell inside the same MAC-CE message. In yet another example, the DCI that activates the SCell may include a codepoint that indicates the TCI state, as described above. Accordingly, the DCI for SCell activation may indicate one TCI state as the TCI state activated for the SCell inside the same DCI.

As an alternative, the message may not include an indicator of the TCI state. Instead, the UE 120 may use one or more rules programmed and/or otherwise preconfigured into the UE 120 (e.g., according to 3GPP specifications and/or another standard) in order to select the TCI state.

In some aspects, the UE 120 may select the TCI state based at least in part on one or more identifiers of one or more configured TCI states associated with a PDSCH. For example, the base station 110a may transmit, and the UE 120 may receive, a data structure (e.g., PDSCH-Config as defined in 3GPP specifications and/or another standard) that indicates the one or more configured TCI states (e.g., in a tci-StatesToAddModList table as defined in 3GPP specifications and/or another standard) in an RRC message that configures the SCell (e.g., an rrcConnectionReconfiguration message as defined in 3GPP specifications and/or another standard). This RRC message may be the same message that activates the SCell, as described above, or may be separate (e.g., the base station 110a may transmit a control element and/or DCI to activate the SCell that was configured using the RRC message). Accordingly, a PDSCH configured for the SCell, which is between the UE 120 and the base station 110b in example 500, may be associated with the one or more configured TCI states. In some aspects, the one or more configured TCI states may have associated identifiers (e.g., numerical indices). Accordingly, the UE 120 may select a TCI state from the one or more configured TCI states based at least in part on that TCI state having a smallest associated identifier (e.g., a smallest integer as an associated index). In some examples, the UE 120 may determine the TCI state (e.g., having a lowest or highest ID) among those included in the RRC command that configures and/or activates the SCell as the TCI activated for the SCell.

Additionally, or alternatively, the UE 120 may select the TCI state based at least in part on one or more identifiers of one or more CORESETs associated with the SCell. For example, the base station 110a may transmit, and the UE 120 may receive, one or more data structures (e.g., one or more ControlResourceSets as defined in 3GPP specifications and/or another standard) that may indicate one or more CORESETs to use on the SCell. In some aspects, the one or more CORESETs may be associated with one or more corresponding TCI states indicated (e.g., using one or more tci-PresentInDCI data structures as defined in 3GPP specifications and/or another standard) in an RRC message that configures the SCell (e.g., an rrcConnectionReconfiguration message as defined in 3GPP specifications and/or another standard). This RRC message may be the same message that activates the SCell, as described above, or may be separate (e.g., the base station 110a may transmit a control element and/or DCI to activate the SCell that was configured using the RRC message). In some aspects, the one or more CORESETs may have associated identifiers (e.g., numerical IDs). Accordingly, the UE 120 may select a TCI state based at least in part on that TCI state being associated with a CORESET that has a smallest associated identifier (e.g., a smallest integer as an associated ID). In some example, the UE 120 may determine the TCI state of a CORESET with a lowest ID included in the RRC command that configures and/or activates the SCell as the TCI state activated for the SCell. As an alternative, the UE 120 may determine the TCI state associated with a CORESET of another cell as the TCI state activated for the SCell. For example, the CORESET may be associated with the lowest controlResourceSetId in intra-band CA.

In some aspects, the UE 120 may select the TCI state based at least in part on one or more identifiers of the CORESET(s) when one or more CORESETs are configured for the SCell, but may, as described above, select the TCI state based at least in part on one or more identifiers of one or more configured TCI states associated with a PDSCH when no CORESETs are configured for the SCell.

Additionally, or alternatively, the UE 120 may select the TCI state based at least in part on an SSB transmitted on the SCell. For example, the UE 120 may use the TCI state or QCL assumption associated with the SSB that is transmitted on the SCell (e.g., by the base station 110b in example 500). In some aspects, the UE 120 may select the TCI state based at least in part on one or more identifiers of the CORESET(s) when one or more CORESETs are configured for the SCell, as described above, but may select the TCI state associated with the SSB when no CORESETs are configured for the SCell. Additionally, or alternatively, the UE 120 may select the TCI state based at least in part on one or more identifiers of one or more configured TCI states associated with a PDSCH when one or more TCI states are configured for the SCell, as described above, but may select the TCI state associated with the SSB when no TCI states are configured for the SCell.

Additionally, or alternatively, the UE 120 may select the TCI state based at least in part on a TCI state associated with a PDCCH. For example, the base station 110a may transmit, and the UE 120 may receive, a data structure (e.g., a ControlResourceSet as defined in 3GPP specifications and/or another standard) that may indicate a CORESET to use for the PDCCH (e.g., between the UE 120 and the base station 110b in example 500). In some aspects, the CORESET may be associated with a TCI state indicated (e.g., using a tci-StatesPDCCH data structure as defined in 3GPP specifications and/or another standard) in an RRC message that configures the SCell (e.g., an rrcConnectionReconfiguration message as defined in 3GPP specifications and/or another standard). This RRC message may be the same message that activates the SCell, as described above, or may be separate (e.g., the base station 110a may transmit a control element and/or DCI to activate the SCell that was configured using the RRC message). Accordingly, the PDCCH configured for the SCell, which is between the UE 120 and the base station 110b in example 500, may be associated with that TCI state. Accordingly, the UE 120 may use that TCI state on the SCell. For example, if only a single TCI state is configured by RRC message for one or more CORESETs on the SCell, the UE 120 may determine that single TCI state as the TCI state activated for the SCell, such that no separate activation of TCI state is transmitted.

In some aspects, the UE 120 may select the TCI state based at least in part on the TCI state associated with the PDCCH when the PDCCH is configured for the SCell, but may select the TCI state associated with an SSB, as described above, when no PDCCH is configured for the SCell. Additionally, or alternatively, the UE 120 may select the TCI state based at least in part on one or more identifiers of the CORESET(s) when one or more CORESETs are configured for the SCell, as described above, but may select the TCI state based at least in part on the TCI state associated with the PDCCH when no CORESETs are configured for the SCell. Additionally, or alternatively, the UE 120 may select the TCI state based at least in part on one or more identifiers of one or more configured TCI states associated with a PDSCH when one or more TCI states are configured for the SCell, as described above, but may select the TCI state based at least in part on the TCI state associated with the PDCCH when no TCI states are configured for the SCell.

In any of the aspects described above, the TCI state may be a joint common TCI state that indicates a common beam associated with one or more uplink channels or reference signals and with one or more downlink channels or reference signals. For example, the common beam may be associated with a physical uplink control channel (PUCCH), one or more physical uplink shared channels (PUSCHs), one or more other uplink channels, one or more sounding reference signals (SRSs), and/or one or more other uplink reference signals. Accordingly, the UE 120 may use the beam associated with that TCI state to transmit data on the one or more uplink channels and/or to transmit the one or more uplink reference signals. In addition, the common beam may be associated with a PDCCH, one or more PDSCHs, one or more other downlink channels, one or more CSI-RSs, and/or one or more other downlink reference signals. Accordingly, the UE 120 may use a spatial filter associated with that TCI state to receive data on the one or more downlink channels and/or to measure the one or more downlink reference signals.

As an alternative, the TCI state may be a downlink common TCI state that indicates a common beam associated with two or more downlink channels or reference signals. For example, the common beam may be associated with a PDCCH, one or more PDSCHs, one or more other downlink channels, one or more CSI-RSs, and/or one or more other downlink reference signals. Accordingly, the UE 120 may use a spatial filter associated with that TCI state to receive data on the one or more downlink channels and/or to measure the one or more downlink reference signals. However, the common beam may not be used to transmit data on uplink channels or to transmit uplink reference signals.

As an alternative, the TCI state may be an uplink common TCI state that indicates a common beam associated with two or more uplink channels or reference signals. For example, the common beam may be associated with a PUCCH, one or more PUSCHs, one or more other uplink channels, one or more SRSs, and/or one or more other uplink reference signals. Accordingly, the UE 120 may use the beam associated with that TCI state to transmit data on the one or more uplink channels and/or to transmit the one or more uplink reference signals. However, the common beam may not be used to receive data on downlink channels or to measure downlink reference signals.

As an alternative, the TCI state may be a downlink TCI state that indicates a beam associated with one downlink channel or reference signal. For example, the beam may be associated with a PDCCH, a PDSCH, another downlink channel, a CSI-RS, or another downlink reference signal. Accordingly, the UE 120 may use a spatial filter associated with that TCI state to receive data on the downlink channel or to measure the downlink reference signal. However, the beam may not be used to receive data on other downlink channels, to measure other downlink reference signals, to transmit data on uplink channels, or to transmit uplink reference signals.

As an alternative, the TCI state may be an uplink TCI state that indicates a beam associated with one uplink channel or reference signal. For example, the beam may be associated with a PUCCH, a PUSCH, another uplink channel, an SRS, or another uplink reference signal. Accordingly, the UE 120 may use the beam associated with that TCI state to transmit data on the uplink channel or to transmit the uplink reference signal. However, the beam may not be used to transmit data on other uplink channels, to transmit other uplink reference signals, to receive data on downlink channels, or to measure downlink reference signals.

In some aspects, an indication of a pathloss reference signal may be included in or associated with a TCI state, such as an uplink TCI state or a joint TCI state, as described above. Accordingly, the UE 120 may determine the pathloss reference signal (e.g., to use for the uplink transmissions as described above in connection with FIG. 5) based at least in part the TCI state. As an alternative, the pathloss reference signal may not be not associated with or included in the TCI state, such that the UE 120 may select a periodic downlink reference signal, based at least in part a source reference signal for determining a spatial filter in an uplink TCI state or a joint TCI state, as the pathloss reference signal.

As shown by reference number 615, the UE 120 may transmit information (e.g., to the base station 110*b*) and/or receive information (e.g., from the base station 110*b*), using the TCI state, based at least in part on receiving the message (e.g., as described above in connection with reference number 605) and without receiving the additional message that indicates the TCI state for activation. Accordingly, the UE 120 may transmit on the SCell using a beam associated with the TCI state and/or may receive on the SCell using a spatial filter associated with the TCI state.

By using techniques as described in connection with FIG. 6, the base station 110*a* may indicate the TCI state for activation in the message that indicates the SCell for activation. As an alternative, the UE 120 may determine the TCI state to use based at least in part on the message that indicates the SCell for activation and without the additional message to activate the TCI state. As a result, the UE 120 may experience increased throughput and/or reduced latency by using the SCell earlier than if the base station 110*a* had transmitted the additional message to activate the TCI state. Additionally, the base station 110*a* may conserve network overhead and resources by refraining from transmitting the additional message to activate the TCI state.

Example 600 may be combined with example 500. For example, the base station 110*a* may indicate both a pathloss reference signal to measure and a TCI state to use on the SCell in a message activating the SCell. In another example, the base station 110*a* may indicate a pathloss reference signal to measure in a message activating the SCell (e.g., as described above in connection with FIG. 5), and the UE 120 may determine (e.g., using one or more rules as described in connection with FIG. 6) the TCI state to use on the SCell without receiving an additional message activating that TCI state. In another example, the base station 110*a* may indicate a TCI state to use in a message activating the SCell (e.g., as described in connection with FIG. 6), and the UE 120 may determine (e.g., using one or more rules as described above in connection with FIG. 5) the pathloss reference signal to measure on the SCell without receiving an additional message activating that reference signal.

As indicated above, FIG. 6 is provided as an example. Other examples may differ from what is described with respect to FIG. 6.

Figure 7:
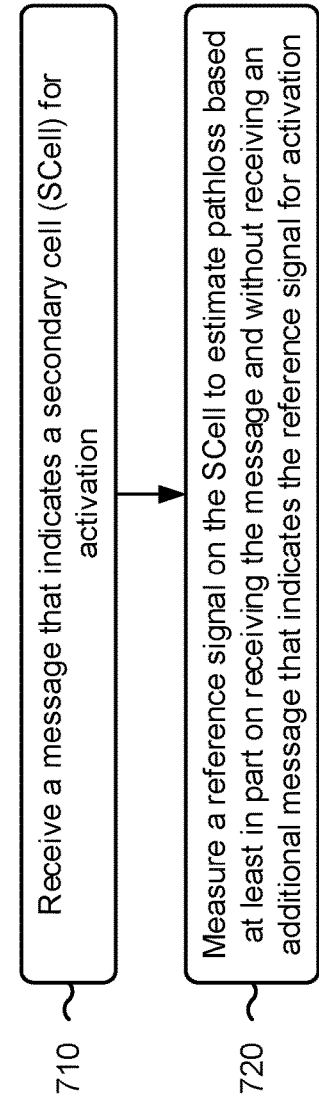
FIGS. 7 and 8 are diagrams illustrating example processes associated with activating a pathloss reference signal with secondary cell SCell activation, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 1100 of FIG. 11) performs operations associated with pathloss reference signal activation with SCell activation.

As shown in FIG. 7, in some aspects, process 700 may include receiving, from a base station (e.g., base station 110 and/or apparatus 1200 of FIG. 12), a message that indicates an SCell for activation (block 710). For example, the UE (e.g., using reception component 1102, depicted in FIG. 11) may receive the message that indicates the SCell for activation, as described above.

As further shown in FIG. 7, in some aspects, process 700 may include measuring a reference signal on the SCell to estimate pathloss based at least in part on receiving the message and without receiving an additional message that indicates the reference signal for activation (block 720). For example, the UE (e.g., using measurement component 1108, depicted in FIG. 11) may measure the reference signal on the SCell to estimate pathloss, as described above.

Process 700 may include additional aspects, such as any single aspect or any combination of aspects described below and/or in connection with one or more other processes described elsewhere herein.

With respect to process 700, in a first aspect, the message includes an indicator of the reference signal.

With respect to process 700, in a second aspect, process 700 includes further selecting (e.g., using determination component 1110, depicted in FIG. 11) the reference signal to measure, where the message does not include an indicator of the reference signal.

With respect to process 700, in a third aspect, alone or in combination with the second aspect, the reference signal is selected based at least in part on one or more identifiers of one or more configured TCI states associated with a PDSCH.

With respect to process 700, in a fourth aspect, alone or in combination with one or more of the second and third aspects, the reference signal is selected based at least in part on one or more identifiers of one or more CORESETs associated with the SCell.

With respect to process 700, in a fifth aspect, alone or in combination with one or more of the second through fourth aspects, the reference signal is selected based at least in part on an SSB transmitted on the SCell.

With respect to process 700, in a sixth aspect, alone or in combination with one or more of the second through fifth aspects, the reference signal is selected based at least in part on a TCI state associated with a PDCCH.

With respect to process 700, in a seventh aspect, alone or in combination with one or more of the first through sixth aspects, the message is included in an RRC message, a control element, or DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
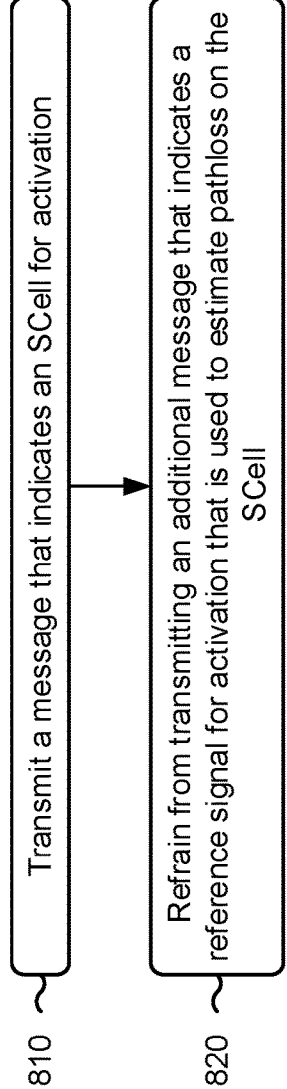

FIG. 8 is a diagram illustrating an example process 800 performed, for example, by a base station, in accordance with the present disclosure. Example process 800 is an example where the base station (e.g., base station 110 and/or apparatus 1200 of FIG. 12) performs operations associated with TCI state activation with SCell activation.

As shown in FIG. 8, in some aspects, process 800 may include transmitting, to a UE (e.g., UE 120 and/or apparatus 1100 of FIG. 11), a message that indicates an SCell for activation (block 810). For example, the base station (e.g., using transmission component 1204, depicted in FIG. 12) may transmit the message that indicates the SCell for activation, as described above.

As further shown in FIG. 8, in some aspects, process 800 may include refraining from transmitting, to the UE, an additional message that indicates a reference signal for activation that is used to estimate pathloss on the SCell (block 820). For example, the base station (e.g., using transmission component 1204) may refrain from transmitting the additional message, as described above.

Process 800 may include additional aspects, such as any single aspect or any combination of aspects described below and/or in connection with one or more other processes described elsewhere herein.

With respect to process 800, in a first aspect, the message includes an indicator of the reference signal.

With respect to process 800, in a second aspect, the message does not include an indicator of the reference signal.

With respect to process 800, in a third aspect, alone or in combination with the second aspect, the reference signal is selected based at least in part on one or more identifiers of one or more configured TCI states associated with a PDSCH.

With respect to process 800, in a fourth aspect, alone or in combination with one or more of the second and third aspects, the reference signal is selected based at least in part on one or more identifiers of one or more CORESETs associated with the SCell.

With respect to process 800, in a fifth aspect, alone or in combination with one or more of the second through fourth aspects, the reference signal is selected based at least in part on an SSB transmitted on the SCell.

With respect to process 800, in a sixth aspect, alone or in combination with one or more of the second through fifth aspects, the reference signal is selected based at least in part on a TCI state associated with a PDCCH.

With respect to process 800, in a seventh aspect, alone or in combination with one or more of the first through sixth aspects, the message is included in an RRC message, a control element, or DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
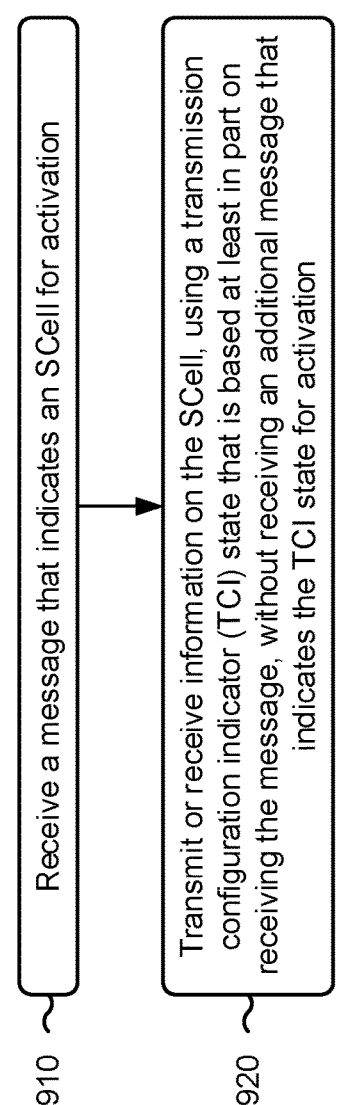
FIGS. 9 and 10 are diagrams illustrating example processes associated with activating a TCI state with SCell activation, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with TCI state activation with SCell activation.

As shown in FIG. 9, in some aspects, process 900 may include receiving, from a base station (e.g., base station 110 and/or apparatus 1200 of FIG. 12), a message that indicates an SCell for activation (block 910). For example, the UE (e.g., using reception component 1102, depicted in FIG. 11) may receive the message that indicates the SCell for activation, as described above.

As further shown in FIG. 9, in some aspects, process 900 may include transmitting or receiving information on the SCell, using a TCI state that is based at least in part on receiving the message, without receiving an additional message that indicates the TCI state for activation (block 920). For example, the UE (e.g., using reception component 1102 and/or using transmission component 1104, depicted in FIG. 11) may transmit or receive information on the SCell, as described above.

Process 900 may include additional aspects, such as any single aspect or any combination of aspects described below and/or in connection with one or more other processes described elsewhere herein.

With respect to process 900, in a first aspect, alone or in combination with the first aspect, the message includes an indicator of the TCI state.

With respect to process 900, in a second aspect, process 900 further includes selecting (e.g., using determination component 1110, depicted in FIG. 11) the TCI state to use, where the message does not include an indicator of the TCI state.

With respect to process 900, in a third aspect, alone or in combination with the second aspect, the TCI state is selected based at least in part on one or more identifiers of one or more configured TCI states associated with a PDSCH.

With respect to process 900, in a fourth aspect, alone or in combination with one or more of the second and third aspects, the TCI state is selected based at least in part on one or more identifiers of one or more CORESETs associated with the SCell.

With respect to process 900, in a fifth aspect, alone or in combination with one or more of the second through fourth aspects, the TCI state is selected based at least in part on an SSB transmitted on the SCell.

With respect to process 900, in a sixth aspect, alone or in combination with one or more of the second through fifth aspects, the TCI state is selected based at least in part on a TCI state associated with a PDCCH.

With respect to process 900, in a seventh aspect, alone or in combination with one or more of the first through sixth aspects, the message is included in an RRC message, a control element, or DCI.

With respect to process 900, in an eighth aspect, alone or in combination with one or more of the first through seventh aspects, the TCI state is a joint common TCI state that indicates a common beam associated with one or more uplink channels or reference signals and with one or more downlink channels or reference signals.

With respect to process 900, in a ninth aspect, alone or in combination with one or more of the first through seventh aspects, the TCI state is a downlink common TCI state that indicates a common beam associated with two or more downlink channels or reference signals.

With respect to process 900, in a tenth aspect, alone or in combination with one or more of the first through seventh aspects, the TCI state is an uplink common TCI state that indicates a common beam associated with two or more uplink channels or reference signals.

With respect to process 900, in an eleventh aspect, alone or in combination with one or more of the first through seventh aspects, the TCI state is a downlink TCI state that indicates a beam associated with one downlink channel or reference signal.

With respect to process 900, in a twelfth aspect, alone or in combination with one or more of the first through seventh aspects, the TCI state is an uplink TCI state that indicates a beam associated with one uplink channel or reference signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
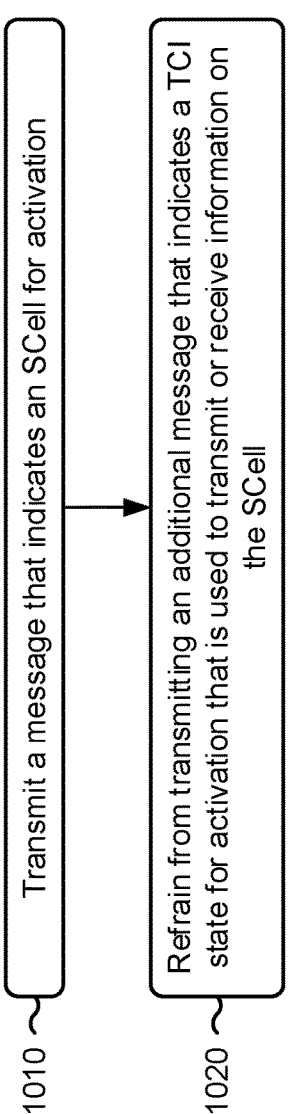

FIG. 10 is a diagram illustrating an example process 1000 performed, for example, by a base station, in accordance with the present disclosure. Example process 1000 is an example where the base station (e.g., base station 110 and/or apparatus 1200 of FIG. 12) performs operations associated with TCI activation with SCell activation.

As shown in FIG. 10, in some aspects, process 1000 may include transmitting, to a UE (e.g., UE 120 and/or apparatus 1100 of FIG. 11), a message that indicates an SCell for activation (block 1010). For example, the base station (e.g., using transmission component 1204, depicted in FIG. 12) may transmit the message that indicates the SCell for activation, as described above.

As further shown in FIG. 10, in some aspects, process 1000 may include refraining from transmitting, to the UE, an additional message that indicates a TCI state for activation that is used to transmit or receive information on the SCell (block 1020). For example, the base station (e.g., using transmission component 1204) may refrain from transmitting the additional message, as described above.

Process 1000 may include additional aspects, such as any single aspect or any combination of aspects described below and/or in connection with one or more other processes described elsewhere herein.

With respect to process 1000, in a first aspect, the message includes an indicator of the TCI state.

With respect to process 1000, in a second aspect, the message does not include an indicator of the TCI state.

With respect to process 1000, in a third aspect, alone or in combination with the second aspect, the TCI state is selected based at least in part on one or more identifiers of one or more configured TCI states associated with a PDSCH.

With respect to process 1000, in a fourth aspect, alone or in combination with one or more of the second and third aspects, the TCI state is selected based at least in part on one or more identifiers of one or more CORESETs associated with the SCell.

With respect to process 1000, in a fifth aspect, alone or in combination with one or more of the second through fourth aspects, the TCI state is selected based at least in part on an SSB transmitted on the SCell.

With respect to process 1000, in a sixth aspect, alone or in combination with one or more of the second through fifth aspects, the TCI state is selected based at least in part on a TCI state associated with a PDCCH.

With respect to process 1000, in a seventh aspect, alone or in combination with one or more of the first through sixth aspects, the message is included in an RRC message, a control element, or DCI.

With respect to process 1000, in an eighth aspect, alone or in combination with one or more of the first through seventh aspects, the TCI state is a joint common TCI state that indicates a common beam associated with one or more uplink channels or reference signals and with one or more downlink channels or reference signals.

With respect to process 1000, in a ninth aspect, alone or in combination with one or more of the first through seventh aspects, the TCI state is a downlink common TCI state that indicates a common beam associated with two or more downlink channels or reference signals.

With respect to process 1000, in a tenth aspect, alone or in combination with one or more of the first through seventh aspects, the TCI state is an uplink common TCI state that indicates a common beam associated with two or more uplink channels or reference signals.

With respect to process 1000, in an eleventh aspect, alone or in combination with one or more of the first through seventh aspects, the TCI state is a downlink TCI state that indicates a beam associated with one downlink channel or reference signal.

With respect to process 1000, in a twelfth aspect, alone or in combination with one or more of the first through seventh aspects, the TCI state is an uplink TCI state that indicates a beam associated with one uplink channel or reference signal.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
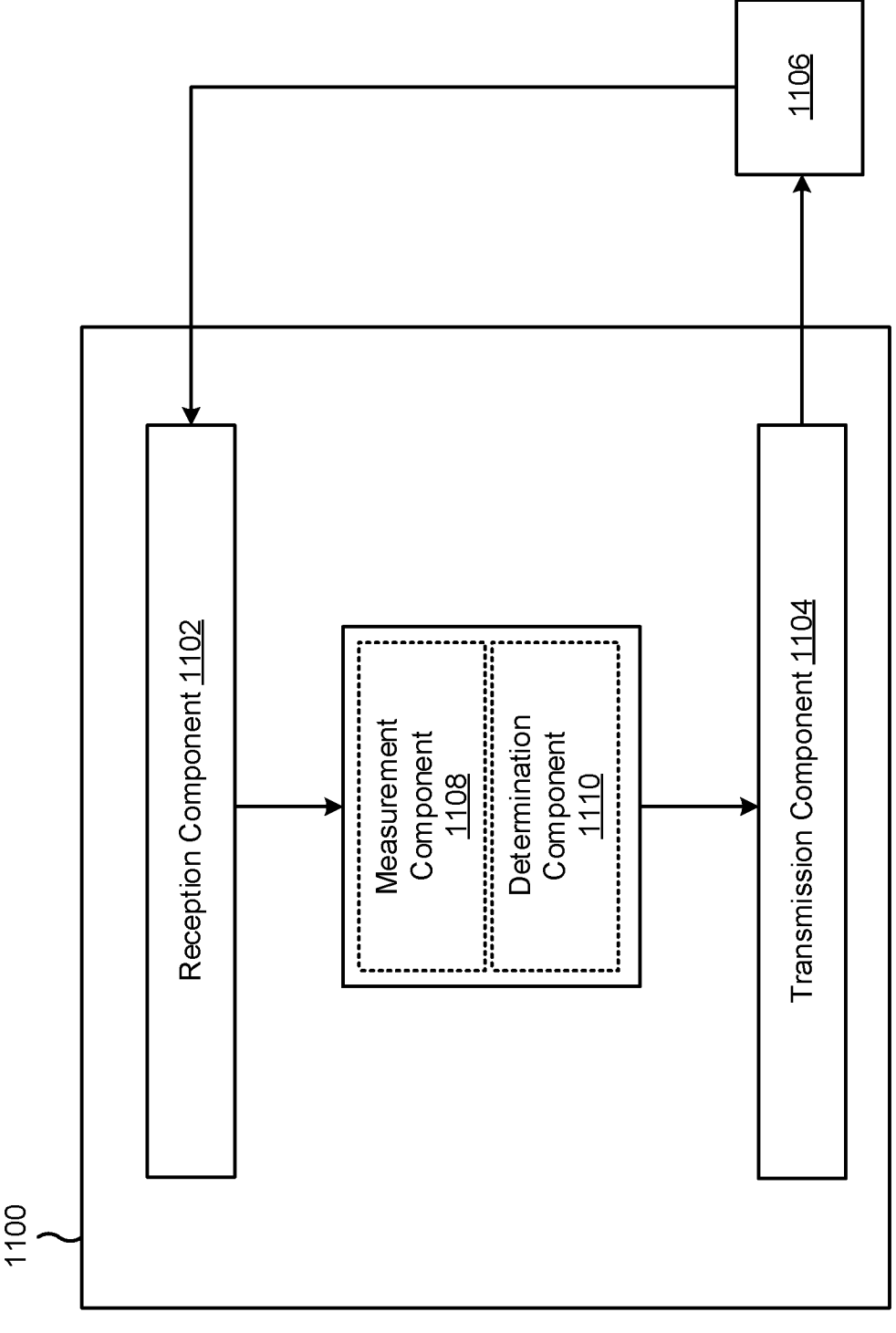
FIGS. 11 and 12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a measurement component 1108 or a determination component 1110, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the reception component 1102 may receive, from the apparatus 1106, a message that indicates an SCell for activation. Accordingly, the measurement component 1108 may measure a reference signal on the SCell to estimate pathloss based at least in part on the reception component 1102 receiving the message and without the reception component 1102 receiving an additional message that indicates the reference signal for activation. In some aspects, the measurement component 1108 may include one or more antennas, a demodulator, a MIMO detector, a receive processor, a controller/processor, a memory, or a combination thereof, of the UE described above in connection with FIG. 2. In some aspects, the determination component 1110 may select the reference signal to measure (e.g., when the message does not include an indicator of the reference signal). In some aspects, the determination component 1110 may include a MIMO detector, a receive processor, a transmit MIMO processor, a transmit processor, a controller/processor, a memory, or a combination thereof, of the UE described above in connection with FIG. 2.

Additionally, or alternatively, the transmission component 1104 may transmit information and/or the reception component 1102 may receive information on the SCell, using a TCI state that is based at least in part on the reception component 1102 receiving the message and without the reception component 1102 receiving an additional message that indicates the TCI state for activation. In some aspects, the determination component 1110 may select the TCI state to use (e.g., when the message does not include an indicator of the TCI state).

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
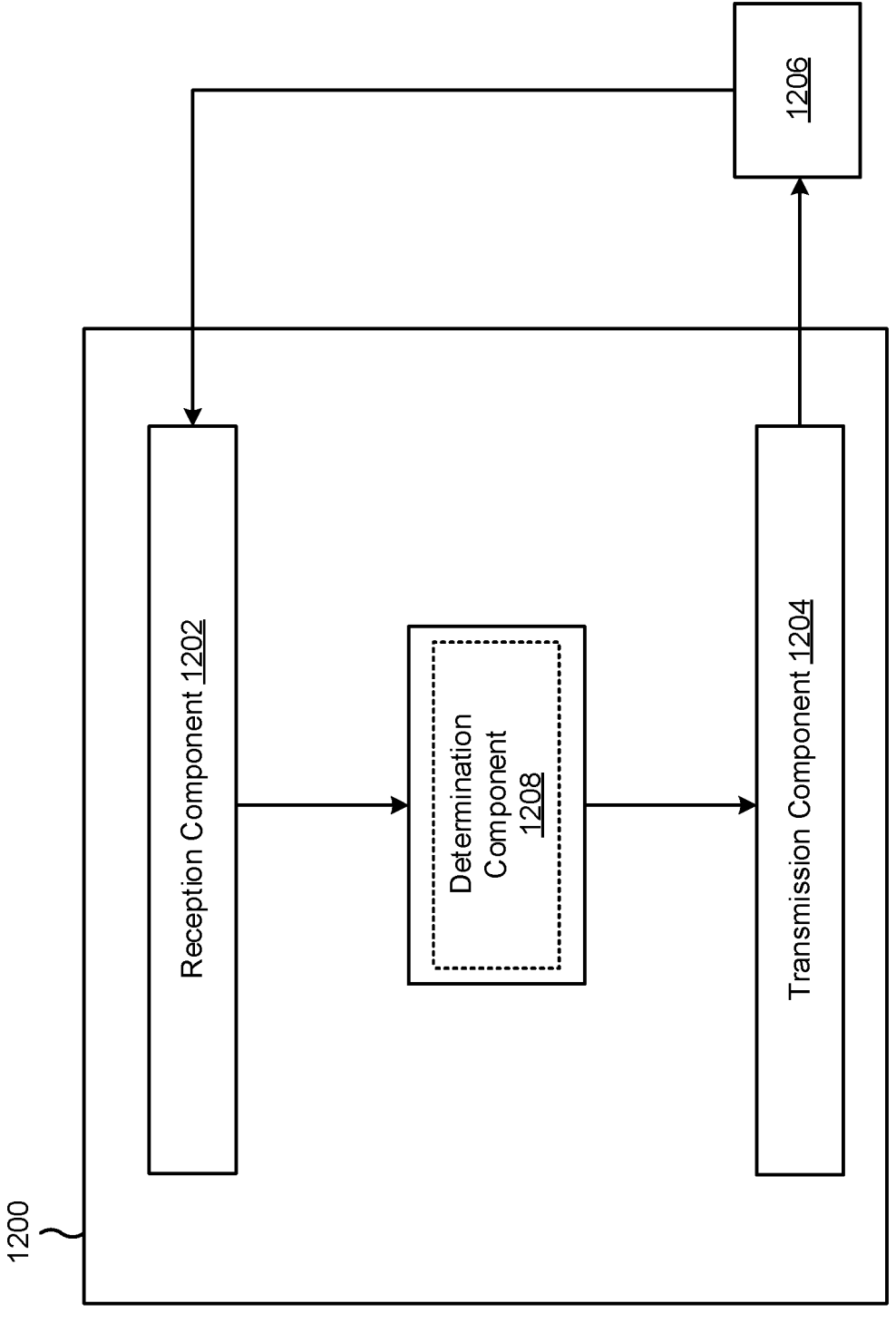

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component

1204. As further shown, the apparatus 1200 may include a determination component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

In some aspects, the transmission component 1204 may transmit, to the apparatus 1206, a message that indicates an SCell for activation. Additionally, the transmission component 1204 may refrain from transmitting, to the apparatus 1206, an additional message that indicates a reference signal for activation that is used to estimate pathloss on the SCell. For example, the determination component 1208 may determine the reference signal that the apparatus 1206 will use based at least in part on the message and without the transmission component 1204 transmitting the additional message. In some aspects, the reception component 1202 may include a MIMO detector, a receive processor, a transmit MIMO processor, a transmit processor, a controller/processor, a memory, or a combination thereof, of the base station described above in connection with FIG. 2.

Additionally, or alternatively, the transmission component 1204 may refrain from transmitting, to the apparatus 1206, an additional message that indicates a TCI state for activation that is used to transmit or receive information on the SCell. For example, the determination component 1208 may determine the TCI state that the apparatus 1206 will use based at least in part on the message and without the transmission component 1204 transmitting the additional message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a message that indicates a secondary cell (SCell) for activation; and measuring a reference signal on the SCell to estimate pathloss based at least in part on receiving the message and without receiving an additional message that indicates the reference signal for activation.

Aspect 2: The method of Aspect 1, wherein the message is included in a radio resource control (RRC) message, a control element, or downlink control information (DCI).

Aspect 3: The method of any of Aspects 1 through 2, further comprising: selecting the reference signal to measure, wherein the message does not include an indicator of the reference signal.

Aspect 4: The method of Aspect 3, wherein the reference signal is selected based at least in part on one or more identifiers of one or more configured transmission configuration indicator (TCI) states associated with a physical downlink shared channel (PDSCH).

Aspect 5: The method of any of Aspects 3 through 4, wherein the reference signal is selected based at least in part on one or more identifiers of one or more control resource sets (CORESETs) associated with the SCell.

Aspect 6: The method of any of Aspects 3 through 5, wherein the reference signal is selected based at least in part on a synchronization signal block (SSB) transmitted on the SCell.

Aspect 7: The method of any of Aspects 3 through 6, wherein the reference signal is selected based at least in part on a transmission configuration indicator (TCI) state associated with a physical downlink control channel (PDCCH).

Aspect 8: The method of any of Aspects 1 through 2, wherein the message includes an indicator of the reference signal.

Aspect 9: A method of wireless communication performed by a base station, comprising: transmitting, to a user equipment (UE), a message that indicates a secondary cell (SCell) for activation; and refraining from transmitting, to the UE, an additional message that indicates a reference signal for activation that is used to estimate pathloss on the SCell.

Aspect 10: The method of Aspect 9, wherein the message is included in a radio resource control (RRC) message, a control element, or downlink control information (DCI).

Aspect 11: The method of any of Aspects 9 through 10, wherein the message does not include an indicator of the reference signal.

Aspect 12: The method of Aspect 11, wherein the reference signal is selected based at least in part on one or more identifiers of one or more configured transmission configuration indicator (TCI) states associated with a physical downlink shared channel (PDSCH).

Aspect 13: The method of any of Aspects 11 through 12, wherein the reference signal is selected based at least in part on one or more identifiers of one or more control resource sets (CORESETs) associated with the SCell.

Aspect 14: The method of any of Aspects 11 through 13, wherein the reference signal is selected based at least in part on a synchronization signal block (SSB) transmitted on the SCell.

Aspect 15: The method of any of Aspects 11 through 14, wherein the reference signal is selected based at least in part on a transmission configuration indicator (TCI) state associated with a physical downlink control channel (PDCCH).

Aspect 16: The method of any of Aspects 9 through 10, wherein the message includes an indicator of the reference signal.

Aspect 17: A method of wireless communication performed by a user equipment (UE), comprising: receiving, from a base station, a message that indicates a secondary cell (SCell) for activation; and transmitting or receiving information on the SCell, using a transmission configuration indicator (TCI) state that is based at least in part on receiving the message, without receiving an additional message that indicates the TCI state for activation.

Aspect 18: The method of Aspect 17, wherein the message is included in a radio resource control (RRC) message, a control element, or downlink control information (DCI).

Aspect 19: The method of any of Aspects 17 through 18, further comprising: selecting the TCI state to use, wherein the message does not include an indicator of the TCI state.

Aspect 20: The method of Aspect 19, wherein the TCI state is selected based at least in part on one or more identifiers of one or more configured transmission configuration indicator (TCI) states associated with a physical downlink shared channel (PDSCH).

Aspect 21: The method of any of Aspects 19 through 20, wherein the TCI state is selected based at least in part on one or more identifiers of one or more control resource sets (CORESETs) associated with the SCell.

Aspect 22: The method of any of Aspects 19 through 21, wherein the TCI state is selected based at least in part on a synchronization signal block (SSB) transmitted on the SCell.

Aspect 23: The method of any of Aspects 19 through 22, wherein the TCI state is selected based at least in part on a TCI state associated with a physical downlink control channel (PDCCH).

Aspect 24: The method of any of Aspects 17 through 18, wherein the message includes an indicator of the TCI state.

Aspect 25: The method of any of Aspects 17 through 24, wherein the TCI state is a joint common TCI state that indicates a common beam associated with one or more uplink channels or reference signals and with one or more downlink channels or reference signals.

Aspect 26: The method of any of Aspects 17 through 24, wherein the TCI state is a downlink common TCI state that indicates a common beam associated with two or more downlink channels or reference signals.

Aspect 27: The method of any of Aspects 17 through 24, wherein the TCI state is an uplink common TCI state that indicates a common beam associated with two or more uplink channels or reference signals.

Aspect 28: The method of any of Aspects 17 through 24, wherein the TCI state is a downlink TCI state that indicates a beam associated with one downlink channel or reference signal.

Aspect 29: The method of any of Aspects 17 through 24, wherein the TCI state is an uplink TCI state that indicates a beam associated with one uplink channel or reference signal.

Aspect 30: A method of wireless communication performed by a base station, comprising: transmitting, to a UE, a message that indicates a secondary cell (SCell) for activation; and refraining from transmitting, to the UE, an additional message that indicates a transmission configuration indicator (TCI) state for activation that is used to transmit or receive information on the SCell.

Aspect 31: The method of Aspect 30, wherein the message is included in a radio resource control (RRC) message, a control element, or downlink control information (DCI).

Aspect 32: The method of any of Aspects 30 through 31, wherein the message does not include an indicator of the TCI state.

Aspect 33: The method of Aspect 32, wherein the TCI state is selected based at least in part on one or more identifiers of one or more configured TCI states associated with a physical downlink shared channel (PDSCH).

Aspect 34: The method of any of Aspects 32 through 33, wherein the TCI state is selected based at least in part on one or more identifiers of one or more control resource sets (CORESETs) associated with the SCell.

Aspect 35: The method of any of Aspects 32 through 34, wherein the TCI state is selected based at least in part on a synchronization signal block (SSB) transmitted on the SCell.

Aspect 36: The method of any of Aspects 32 through 35, wherein the TCI state is selected based at least in part on a TCI state associated with a physical downlink control channel (PDCCH).

Aspect 37: The method of any of Aspects 30 through 31, wherein the message includes an indicator of the TCI state.

Aspect 38: The method of any of Aspects 30 through 37, wherein the TCI state is a joint common TCI state that indicates a common beam associated with one or more uplink channels or reference signals and with one or more downlink channels or reference signals.

Aspect 39: The method of any of Aspects 30 through 37, wherein the TCI state is a downlink common TCI state that indicates a common beam associated with two or more downlink channels or reference signals.

Aspect 40: The method of any of Aspects 30 through 37, wherein the TCI state is an uplink common TCI state that indicates a common beam associated with two or more uplink channels or reference signals.

Aspect 41: The method of any of Aspects 30 through 37, wherein the TCI state is a downlink TCI state that indicates a beam associated with one downlink channel or reference signal.

Aspect 42: The method of any of Aspects 30 through 37, wherein the TCI state is an uplink TCI state that indicates a beam associated with one uplink channel or reference signal.

Aspect 43: An apparatus for wireless communication at a device, comprising a processor; memory coupled with the processor; and instructions stored in the memory and executable by the processor to cause the apparatus to perform the method of one or more of Aspects 1-8.

Aspect 44: A device for wireless communication, comprising a memory and one or more processors coupled to the memory, the memory and the one or more processors configured to perform the method of one or more of Aspects 1-8.

Aspect 45: An apparatus for wireless communication, comprising at least one means for performing the method of one or more of Aspects 1-8.

Aspect 46: A non-transitory computer-readable medium storing code for wireless communication, the code comprising instructions executable by a processor to perform the method of one or more of Aspects 1-8.

Aspect 47: A non-transitory computer-readable medium storing a set of instructions for wireless communication, the set of instructions comprising one or more instructions that, when executed by one or more processors of a device, cause the device to perform the method of one or more of Aspects 1-8.

Aspect 48: An apparatus for wireless communication at a device, comprising a processor; memory coupled with the processor; and instructions stored in the memory and executable by the processor to cause the apparatus to perform the method of one or more of Aspects 9-16.

Aspect 49: A device for wireless communication, comprising a memory and one or more processors coupled to the memory, the memory and the one or more processors configured to perform the method of one or more of Aspects 9-16.

Aspect 50: An apparatus for wireless communication, comprising at least one means for performing the method of one or more of Aspects 9-16.

Aspect 51: A non-transitory computer-readable medium storing code for wireless communication, the code comprising instructions executable by a processor to perform the method of one or more of Aspects 9-16.

Aspect 52: A non-transitory computer-readable medium storing a set of instructions for wireless communication, the set of instructions comprising one or more instructions that, when executed by one or more processors of a device, cause the device to perform the method of one or more of Aspects 9-16.

Aspect 53: An apparatus for wireless communication at a device, comprising a processor; memory coupled with the processor; and instructions stored in the memory and executable by the processor to cause the apparatus to perform the method of one or more of Aspects 17-29.

Aspect 54: A device for wireless communication, comprising a memory and one or more processors coupled to the memory, the memory and the one or more processors configured to perform the method of one or more of Aspects 17-29.

Aspect 55: An apparatus for wireless communication, comprising at least one means for performing the method of one or more of Aspects 17-29.

Aspect 56: A non-transitory computer-readable medium storing code for wireless communication, the code comprising instructions executable by a processor to perform the method of one or more of Aspects 17-29.

Aspect 57: A non-transitory computer-readable medium storing a set of instructions for wireless communication, the set of instructions comprising one or more instructions that, when executed by one or more processors of a device, cause the device to perform the method of one or more of Aspects 17-29.

Aspect 58: An apparatus for wireless communication at a device, comprising a processor; memory coupled with the processor; and instructions stored in the memory and executable by the processor to cause the apparatus to perform the method of one or more of Aspects 30-42.

Aspect 59: A device for wireless communication, comprising a memory and one or more processors coupled to the memory, the memory and the one or more processors configured to perform the method of one or more of Aspects 30-42.

Aspect 60: An apparatus for wireless communication, comprising at least one means for performing the method of one or more of Aspects 30-42.

Aspect 61: A non-transitory computer-readable medium storing code for wireless communication, the code comprising instructions executable by a processor to perform the method of one or more of Aspects 30-42.

Aspect 62: A non-transitory computer-readable medium storing a set of instructions for wireless communication, the set of instructions comprising one or more instructions that, when executed by one or more processors of a device, cause the device to perform the method of one or more of Aspects 30-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory one or more memories; and
one or more processors, coupled to the one or more memories memory, the memory and the one or more processors individually or in any combination configured to cause the apparatus to:
receive, from a base station, a message that indicates a secondary cell (SCell) for activation and a reference signal associated with the SCell; and
measure the reference signal on the SCell to estimate pathloss based at least in part on receiving the message and without receiving an additional message that indicates the reference signal for activation.

2. The apparatus of claim 1, wherein the message is included in a radio resource control (RRC) message, a control element, or downlink control information (DCI).

3. The apparatus of claim 1, wherein the message includes an indicator of the reference signal.

4. The apparatus of claim 1, wherein the memory and the one or more processors individually or in any combination are further configured to cause the apparatus to:
select the reference signal to measure, wherein the message does not include an indicator of the reference signal.

5. The apparatus of claim 4, wherein the reference signal is selected based at least in part on one or more identifiers of one or more configured transmission configuration indicator (TCI) states associated with a physical downlink shared channel (PDSCH).

6. The apparatus of claim 4, wherein the reference signal is selected based at least in part on one or more identifiers of one or more control resource sets (CORESETs) associated with the SCell.

7. The apparatus of claim 4, wherein the reference signal is selected based at least in part on a synchronization signal block (SSB) transmitted on the SCell.

8. The apparatus of claim 4, wherein the reference signal is selected based at least in part on a transmission configuration indicator (TCI) state associated with a physical downlink control channel (PDCCH).

9. An apparatus for wireless communication at a network node base station, comprising:
a memory one or more memories; and
one or more processors, coupled to the one or more memories memory, the memory and the one or more processors individually or in any combination configured to cause the apparatus to:
transmit, to a user equipment (UE), a message that indicates a secondary cell (SCell) for activation and a reference signal associated with the SCell; and
refrain from transmitting, to the UE, an additional message that indicates a reference signal for activation that is used to estimate pathloss on the SCell.

10. The apparatus of claim 9, wherein the message includes an indicator of the reference signal.

11. The apparatus of claim 9, wherein the message does not include an indicator of the reference signal.

12. The apparatus of claim 11, wherein the reference signal is selected based at least in part on one or more identifiers of one or more configured transmission configuration indicator (TCI) states associated with a physical downlink shared channel (PDSCH).

13. The apparatus of claim 11, wherein the reference signal is selected based at least in part on one or more identifiers of one or more control resource sets (CORESETs) associated with the SCell.

14. The apparatus of claim 11, wherein the reference signal is selected based at least in part on a synchronization signal block (SSB) transmitted on the SCell.

15. The apparatus of claim 11, wherein the reference signal is selected based at least in part on a transmission configuration indicator (TCI) state associated with a physical downlink control channel (PDCCH).

16. An apparatus for wireless communication at a user equipment (UE), comprising:
a memory one or more memories; and
one or more processors, coupled to the one or more memories memory, the memory and the one or more processors individually or in any combination configured to cause the apparatus to:
receive, from a base station, a message that indicates a secondary cell (SCell) for activation;
select a transmission configuration indicator (TCI) state to use, wherein the TCI state is preconfigured into the UE and the message does not include an indicator of the TCI state; and
transmit or receive information on the SCell, using the TCI state, without receiving an additional message that indicates the TCI state for activation.

17. The apparatus of claim 16, wherein the message is included in a radio resource control (RRC) message, a control element, or downlink control information (DCI).

18. The apparatus of claim 16, wherein the message includes an indicator of the TCI state.

19. The apparatus of claim 16, wherein the TCI state is selected based at least in part on one or more identifiers of one or more configured transmission configuration indicator (TCI) states associated with a physical downlink shared channel (PDSCH).

20. The apparatus of claim 16, wherein the TCI state is selected based at least in part on one or more identifiers of one or more control resource sets (CORESETs) associated with the SCell.

21. The apparatus of claim 16, wherein the TCI state is selected based at least in part on a synchronization signal block (SSB) transmitted on the SCell.

22. The apparatus of claim 16, wherein the TCI state is selected based at least in part on a TCI state associated with a physical downlink control channel (PDCCH).

23. The apparatus of claim 16, wherein the TCI state is a joint common TCI state that indicates a common beam associated with one or more uplink channels or reference signals and with one or more downlink channels or reference signals.

24. The apparatus of claim 16, wherein the TCI state is a downlink common TCI state that indicates a common beam associated with two or more downlink channels or reference signals.

25. The apparatus of claim 16, wherein the TCI state is an uplink common TCI state that indicates a common beam associated with two or more uplink channels or reference signals.

26. The apparatus of claim 16, wherein the TCI state is a downlink TCI state that indicates a beam associated with one downlink channel or reference signal.

27. The apparatus of claim 16, wherein the TCI state is an uplink TCI state that indicates a beam associated with one uplink channel or reference signal.

28. An apparatus for wireless communication at a network node base station, comprising:

a memory one or more memories; and one or more processors, coupled to the one or more memories memory, the memory and the one or more processors individually or in any combination configured to cause the apparatus to:

transmit, to a user equipment (UE), a message that indicates a secondary cell (SCell) for activation, wherein the message does not include an indicator of a transmission configuration indicator (TCI) state for the UE to use;

refrain from transmitting, to the UE, an additional message that indicates a transmission configuration indicator (TCI) state for activation that is used to transmit or receive information on the SCell; and transmit or receive information on the SCell using a TCI state that is preconfigured into the UE.

29. The apparatus of claim 28, wherein the TCI state is a joint common TCI state that indicates a common beam associated with one or more uplink channels or reference signals and with one or more downlink channels or reference signals.

* * * * *